(12) United States Patent
Tannhäuser

(10) Patent No.: US 11,186,184 B2
(45) Date of Patent: Nov. 30, 2021

(54) ELECTRICALLY OPERATED VEHICLE AND CHARGING SYSTEM

(71) Applicant: Siemens Aktiengesellschaft, Munich (DE)

(72) Inventor: Marvin Tannhäuser, Hausen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 98 days.

(21) Appl. No.: 16/701,577

(22) Filed: Dec. 3, 2019

(65) Prior Publication Data

US 2020/0189402 A1     Jun. 18, 2020

(30) Foreign Application Priority Data

Dec. 12, 2018 (EP) .................................... 18211936

(51) Int. Cl.
| B60L 53/10 | (2019.01) |
| B60L 53/67 | (2019.01) |
| B60L 50/60 | (2019.01) |
| B60L 53/66 | (2019.01) |
| B60L 53/16 | (2019.01) |

(52) U.S. Cl.
CPC .............. B60L 53/11 (2019.02); B60L 50/60 (2019.02); B60L 53/16 (2019.02); B60L 53/66 (2019.02); B60L 53/67 (2019.02); *B60Y 2200/91* (2013.01); *B60Y 2300/91* (2013.01)

(58) Field of Classification Search
CPC ....................................................... B60L 53/11
USPC ....................................................... 320/109
See application file for complete search history.

(56) References Cited

U.S. PATENT DOCUMENTS

| 2004/0130292 A1* | 7/2004 | Buchanan ............... B60L 53/53 320/116 |
| 2013/0049677 A1* | 2/2013 | Bouman ............... B60L 11/185 320/106 |
| 2013/0088197 A1* | 4/2013 | Kim ........................ B60L 53/16 320/109 |
| 2015/0069970 A1* | 3/2015 | Sarkar ..................... B60L 53/14 320/109 |
| 2016/0006346 A1* | 1/2016 | Satoh .................. H02M 1/4225 320/109 |
| 2016/0167678 A1 | 6/2016 | Jestin et al. .................. 320/109 |
| 2019/0148954 A1* | 5/2019 | Jeong ..................... B60L 58/16 320/106 |
| 2019/0202305 A1* | 7/2019 | Jung ..................... B60L 53/305 |

FOREIGN PATENT DOCUMENTS

WO     2010/126894 A1    11/2010    ............... H02J 7/14

OTHER PUBLICATIONS

Extended European Search Report, Application No. 18211936.2, 7 pages, dated May 14, 2019.

* cited by examiner

*Primary Examiner* — Jerry D Robbins
(74) *Attorney, Agent, or Firm* — Slayden Grubert Beard PLLC

(57) ABSTRACT

Various embodiments include an electrically operated vehicle comprising: an electric motor for driving the vehicle; a battery for supplying electrical power to the electric motor; a first charging connection socket for connecting a charging cable for electrically recharging the battery; and a second charging connection socket for connecting a second charging cable for electrically recharging the battery.

9 Claims, 2 Drawing Sheets

ELECTRICALLY OPERATED VEHICLE AND CHARGING SYSTEM

CROSS-REFERENCE TO RELATED APPLICATIONS

This application claims priority to EP Application No. 18211936.2 filed Dec. 12, 2018, the contents of which are hereby incorporated by reference in their entirety.

TECHNICAL FIELD

The present disclosure relates to batteries. Various embodiments may include vehicles and/or charging systems for recharging batteries of electrically operated vehicles.

BACKGROUND

In addition to the lower range of electrically operated vehicles compared to conventional vehicles with an internal combustion engine, a substantial problem is the duration of "refueling", that is to say the recharging of the batteries. While filling up in the case of cars lasts in the range of 2 minutes, in an electric car charging times of 30 minutes and more are usual. The charging times depend here on the capacity of the battery and the power level of the respective charging station. The latter may be 25 kW, 50 kW or even up to 150 kW. Even if the power could still be increased from an electrical point of view, the charging connection cables necessary therefor would be increasingly unmanageable and difficult to use for the private user.

SUMMARY

The teachings of the present disclosure describe electrically operated vehicles improved with respect to the charging time for recharging the battery and charging systems having a plurality of charging stations that makes it possible to improve the charging times. As an example, some embodiments include an electrically operated vehicle (10, 10A) having an electric motor (12) for driving the vehicle (10, 10A), a battery (14) for supplying electrical power to the electric motor (12), and a charging connection socket (18A) for connecting a charging cable (56A . . . E) for electrically recharging the battery (14), characterized by a second charging connection socket (18B) for connecting a second charging cable (56A . . . E) for electrically recharging the battery (14).

In some embodiments, the charging connection sockets (18A, B) are configured for the connection of DC charging cables (56A . . . E).

In some embodiments, the charging connection sockets (18A, B) are electrically connected in parallel.

In some embodiments, there is a communication device (20) for data exchange with a connected charging station (52A . . . E), wherein the communication device (20) is configured to perform data exchange with two connected charging stations (52A . . . E).

In some embodiments, the first charging connection socket (18A) is arranged at a first side of the vehicle (10, 10A) and the second charging connection socket (18B) is arranged on a second side facing away from the first side.

In some embodiments, the system is configured to charge the battery (14) with an overall power of at least 100 kW, in particular at least 240 kW, in a particular configuration at least 300 kW.

As another example, some embodiments include a charging system (50) for electrically recharging batteries (14) of electrically operated vehicles (10, 10A), comprising a plurality of charging stations (52A . . . E) for connecting to a respective vehicle (10, 10A), wherein the charging stations (52A . . . E) each comprise a control device (64A . . . E) for controlling a charging process, wherein at least some of the control devices (64A . . . E) are configured to identify whether two or more of the charging stations (52A . . . E) are connected to the same vehicle (10, 10A).

In some embodiments, the system is configured for DC-based recharging.

In some embodiments, the charging controllers (64A . . . E) of the charging stations (52A . . . E) are configured to regulate the current to a connected battery (14) of a vehicle (10, 10A) and in which at least some of the charging controllers (64A . . . E) are configured to suppress oscillation processes of the regulation of the current when two of the charging stations (52A . . . E) are connected to the same vehicle (10, 10A).

In some embodiments, the system is configured to charge a battery (14) by means of two charging stations (52A . . . E) with an overall power of at least 300 kW.

BRIEF DESCRIPTION OF THE DRAWINGS

Further examples and features can be taken from the following description of embodiments based on the figures. In the figures, identical reference signs denote identical components and functions.

In the figures.

DETAILED DESCRIPTION

Figure 1:
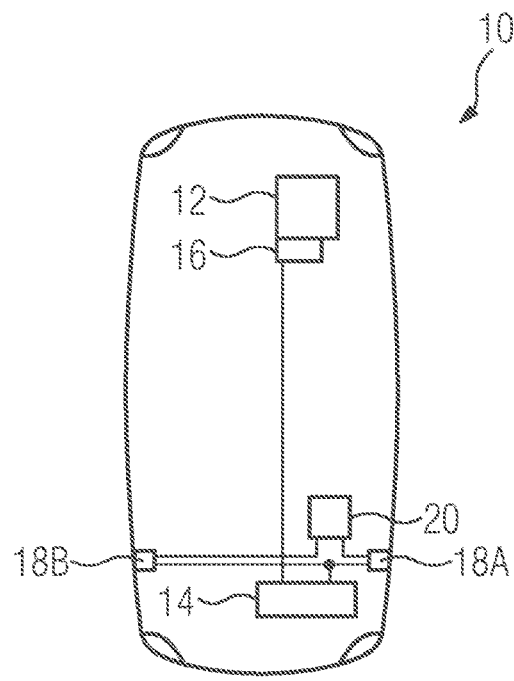
FIG. 1 schematically shows an electrically operated vehicle incorporating teachings of the present disclosure.

In some embodiments, an electrically operated vehicle comprises an electric motor for driving the vehicle, a battery for supplying electrical power to the electric motor, and a charging connection socket for connecting a charging cable for electrically recharging the battery. Furthermore, a second charging connection socket for connecting a second charging cable for electrically recharging the battery is present.

The vehicle may be a car or a utility vehicle such as an electrically operated bus or truck. The vehicle may also comprise a plurality of electric motors. These may be embodied, for example, as wheel hub motors.

In some embodiments, it is possible to achieve doubling of the transmittable power by connecting a second charging cable. This halves the charging time for recharging the battery. Since the charging times are currently still in the range of hours, a halving of the charging time constitutes a significant gain for the individual user. Overall, an improvement in the acceptance of electrically operated vehicles can be achieved as a result.

In some embodiments, a charging system for electrically recharging batteries of electrically operated vehicles comprises a plurality of charging stations for connecting to a respective vehicle, wherein the charging stations each comprise a control device for controlling a charging process. In this case, at least some of the control devices are configured to identify whether two or more of the charging stations are connected to the same vehicle. Such a charging system can thus identify that a correspondingly configured vehicle is connected for recharging. As a result, the control devices of the charging stations can control the charging process in a suitable manner. For example, the current regulation can be set so that electrical oscillation processes of the jointly connected charging stations can be prevented. Furthermore, it is thereby also possible to take into account the fact that two charging stations have been used in parallel when invoicing the charging process. For example, the electricity tariff used can be adjusted.

In this case, the various embodiments can be combined with the features of one of the additional embodiments. In some embodiments, the following features can also additionally be provided:

The charging connection sockets can be configured for the connection of DC charging cables. Charging by means of direct current can currently be used to achieve the highest charging powers of up to 150 kW. Charging powers up to 300 kW are thus possible using two charging cables in the present state of the art. When connecting two DC charging cables, these can be connected in parallel in the vehicle without, for example, further components, such as an additional converter, being necessary. It is understood that the charging system is expediently also a DC charging system.

The vehicle may have a communication device for data exchange with a connected charging station, wherein the communication device is configured to perform data exchange with two connected charging stations. In other words, the communication device may perform data exchange with both connected charging stations in order to control the charging process in a suitable manner.

In some embodiments, the first charging connection socket is arranged on a first side of the vehicle and the second charging connection socket is arranged on a second side facing away from the first side. By way of charging connection sockets on the left and on the right side, the connection to two charging stations located next to one another in typical charging systems is simplified. Furthermore, when connecting just one charging cable, there is free selection of the side to which the cable is plugged. This is in contrast to the typical situation of modern vehicles with an internal combustion engine in which the driver must note on which side the filler neck is fitted for refueling.

The controllers of the charging stations that are configured to regulate the current to a connected battery of a vehicle can furthermore be configured at least partly to suppress oscillation processes of the regulation of the current when two of the charging stations are connected to the same vehicle.

FIG. 1 schematically shows an electrically operated vehicle 10, in this example an automobile. As an example, the vehicle 10 comprises an electric motor 12 for driving. In other embodiments, such vehicles may also comprise a plurality of electric motors, for example one electric motor for each driven wheel. The electric motor 12 is fed from a battery 14, which is connected to the electric motor 12 via a converter 16.

The battery 14 is recharged by means of the connection of a charging cable to one or both of the charging connection sockets 18A, B of the vehicle 10. The charging connection sockets 18A, B are configured for the connection of a DC (direct current) charging cable for charging in accordance with IEC 61851, Mode 4. In the vehicle 10 itself, the charging connection sockets 18A, B are electrically connected directly to the battery 14. In this case, they are electrically connected in parallel. There is a further connection to a vehicle-side control unit 20, which performs, inter alia, data exchange with one or two connected charging stations 52A . . . E. The control unit 20 thereby informs the charging station or stations 52A . . . E for example of the maximum charging power that is supported by the vehicle and that must be noted by the charging station 52A . . . E during the charging operation. To this end, the control unit 20 is connected to both charging connection sockets 18A, B and is configured, electrically as well as in terms of software, to communicate with up to two charging stations 52A . . . E independently of one another.

The control unit 20 can be configured here to receive data regarding the power capacity of the connected charging stations 52A . . . E and to generate a signal when a connection of two charging stations 52A . . . E does not yield any advantage, for example when the respective power thereof is so high that charging via both charging stations 52A . . . E for the battery 14 is not possible. If the maximum charging power on the vehicle side can be exceeded only by both charging stations together, the control unit informs the two connected charging stations 52A . . . E of the required power and communicates corresponding maximum charging powers.

The two charging connection sockets 18A, B of the vehicle 10 are arranged in this example in a similar manner to conventional fuel filler necks in the rear vehicle region. In other examples, the charging connection sockets 18A, B can also be arranged at the front side or at other locations of the vehicle 10. In some embodiments, the charging connection sockets 18A, B are arranged on two sides of the vehicle 10 that face away from one another like in this example. An individual charging station 52A . . . E can thus be connected on both vehicle sides without the cable 56A . . . E having to be led around the vehicle 10. When two charging stations 52A . . . E are connected, these can likewise ideally be connected since the charging stations 52A . . . E are usually positioned approximately at a distance of a car width and each associated with a parking space or two adjacent parking spaces, like in FIG. 2.

Figure 2:
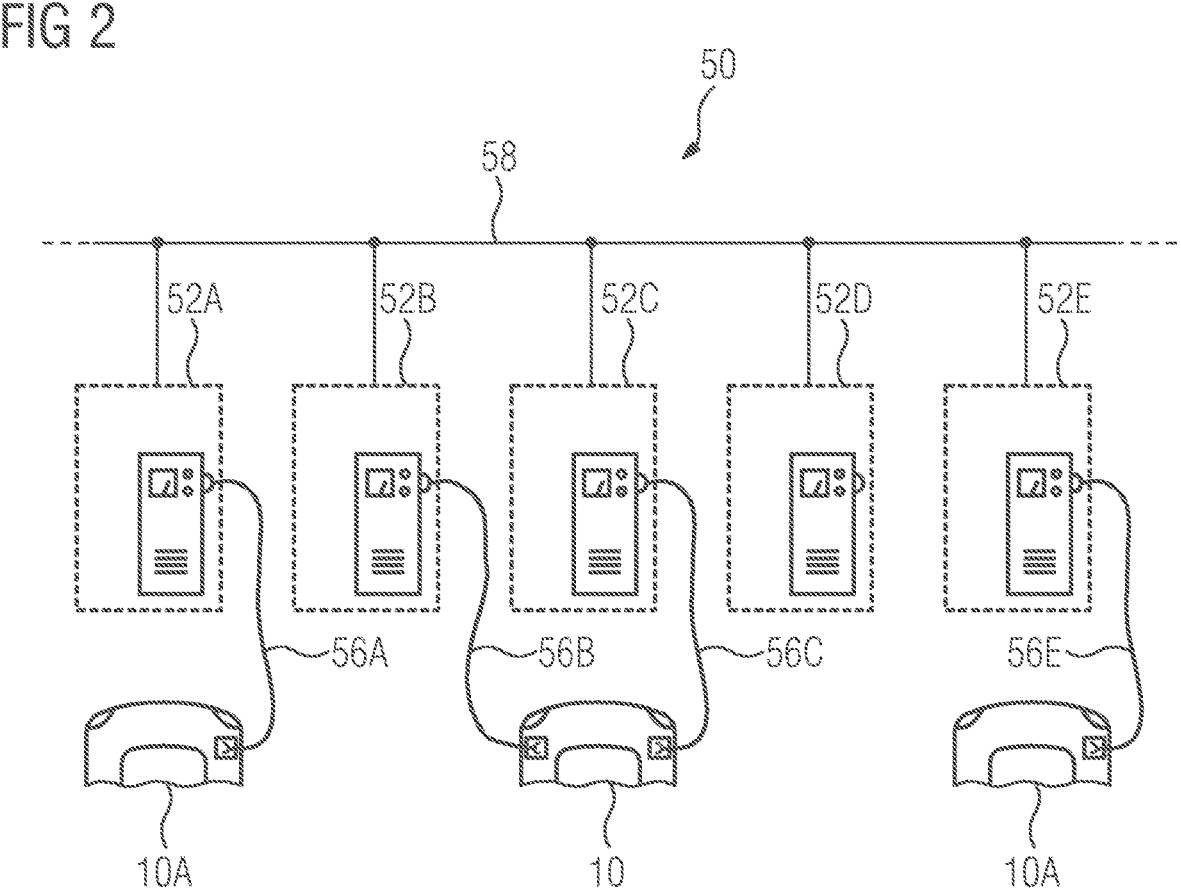
FIG. 2 schematically shows a charging system having a plurality of charging stations incorporating teachings of the present disclosure.

FIG. 2 schematically shows a view of a charging system 50, which comprises a plurality of charging stations 52A . . . E. The charging stations 52A . . . E are connected to a power supply network 58, which may be a low-voltage network or a medium-voltage network. Each of the charging stations 52A . . . E comprises a charging cable 56A . . . E for connection to the charging connection sockets 18A, B of an electrically operated vehicle 10. Likewise shown in FIG. 2 are two further vehicles 10A, which are each connected to a charging cable 56A, E at a respective charging station 52A, E. In this example, the charging stations 52A . . . E are each intended to have a charging power of 120 kW. The further vehicles 10A can thus be charged with a maximum power of 120 kW. Loading of the battery of 80 kWh in this case lasts approximately 40 minutes.

FIG. 2 also shows the connection of the vehicle 10 to two charging stations 52B, C that are located next to one another at the same time. The charging cables 56B, C of the two charging stations 52B, C are connected to the two charging connection sockets 18A, B and therefore both charging stations 52B, C can be used at the same time for charging the battery 14. It is thus possible to charge using up to 240 kW. The charging time for the exemplary 80 kWh is therefore only 20 minutes.

Figure 3:
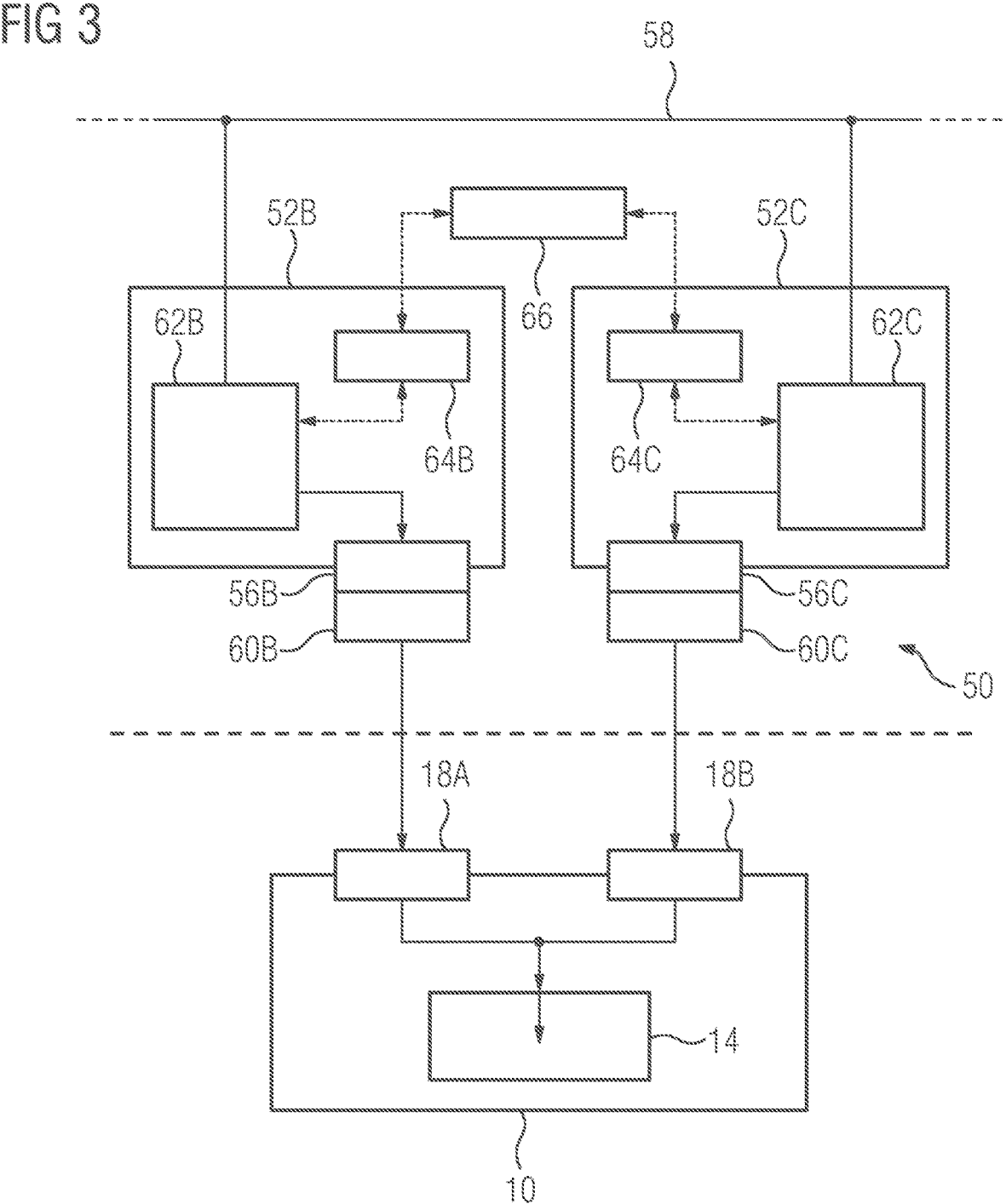
FIG. 3 shows a detailed view of a vehicle having two connected charging stations incorporating teachings of the present disclosure.

FIG. 3 schematically shows the involved components of the vehicle 10 and of the two connected charging stations 52B, C. The battery 14 of the vehicle 10 is connected in parallel with both charging connection sockets 18A, B. The charging current for the battery 14 therefore corresponds to the sum of the charging currents coming from the connected charging stations 52B, C. The charging cables 56B, C of the two charging stations 52B, C are for this purpose plugged into the charging connection sockets 18A, B via respective plugs 60B, C. An AC/DC converter 62B, C present in the two charging stations 52B, C is connected via said plugs to the battery 14. A respective charging controller 64B, C in the two charging stations 52B, C controls the two AC/DC converters 62B, C so that a charging current corresponding to the specifications of the vehicle flows to the battery 14. These specifications are stipulated in advance by way of the control unit 20 of the vehicle in connection with the charging controller 64B, C. The charging current may correspond, for example, to the maximum possible charging current of the charging stations 52B, C, wherein this value is also kept constant by way of regulation.

In some embodiments, the charging controller 64B, C regulates the charging current here so that oscillation processes in the flow of current that may be produced due to the two connected AC/DC converters 62B, C are prevented. This may be effected, for example, by virtue of the two charging controllers 64B, C operating in master/slave operation. To this end, the two charging controllers 64B, C or a superordinate overall controller 66 register that the two charging stations 52B, C are connected to the same vehicle 10 and thereupon change to an operation in which one of the two charging stations 52B, C undertakes a master role and the other of the charging stations 52B, C undertakes a slave role. The charging station 52B, C with the master role undertakes the stipulations for example of the charging current and the charging station 52B, C with the slave role follows the specifications of the charging station 52B, C with the master role.

LIST OF REFERENCE SIGNS

10 Electrically operated vehicle
10A Further vehicles
12 Electric motor
14 Battery
16 Converter
18A, B Charging connection sockets
20 Control unit
50 Charging system
52A . . . E Charging stations
56A . . . E Charging cables
58 Power supply network
60A . . . E Plugs
62A . . . E AC/DC converters
64A . . . E Charging controllers
66 Overall controller

The invention claimed is:

1. A system for operating an electrically operated vehicle, the system comprising:
   an electric motor for driving the vehicle;
   a battery for supplying electrical power to the electric motor;
   a first charging connection socket for connecting a charging cable for electrically recharging the battery; and
   a second charging connection socket for connecting a second charging cable for electrically recharging the battery;
   a plurality of charging stations for connecting to the first charging connection socket and the second charging connection socket;
   wherein each of the plurality of charging stations comprises a respective control device for controlling a charging process;
   wherein at least one of the control devices is configured to identify whether two of the plurality of charging stations are connected to the vehicle; and
   at least one of the plurality of charging controllers is configured to suppress oscillation processes of the regulation of the current when two of the plurality of charging stations are connected to the vehicle.

2. The electrically operated vehicle as claimed in claim 1, in which the charging connection sockets are configured for the connection of DC charging cables.

3. The electrically operated vehicle as claimed in claim 1, in which the charging connection sockets are electrically connected in parallel.

4. The electrically operated vehicle as claimed in claim 1, further comprising a communication device for data exchange with a connected charging station;
   wherein the communication device is configured to perform data exchange with two connected charging stations.

5. The electrically operated vehicle as claimed in claim 1, wherein the first charging connection socket is arranged at a first side of the vehicle and the second charging connection socket arranged on a second side facing away from the first side.

6. The electrically operated vehicle as claimed in claim 1, configured to charge the battery with an overall power of at least 100 kW.

7. A charging system for electrically recharging batteries of electrically operated vehicles, the system comprising:
   a plurality of charging stations for connecting to a respective vehicle;
   wherein each of the plurality of charging stations comprises a respective control device for controlling a charging process by regulating the current to a connected battery of the respective vehicle;
   wherein at least some of the control devices are configured to identify whether two or more of the charging stations are connected to the same vehicle; and
   at least some of the plurality of charging controllers are configured to suppress oscillation processes of the regulation of the current when two of the charging stations are connected to the same vehicle.

8. The charging system as claimed in claim 7, wherein at least some of the plurality of charging stations are configured for DC-based recharging.

9. The charging system as claimed one of claim 7, configured to charge a battery using two charging stations with an overall power of at least 300 kW.

* * * * *